Sept. 27, 1927.  
A. COLONNA  
1,643,576  
BOX JOINT GROOVING MACHINE  
Original Filed Aug. 24, 1925
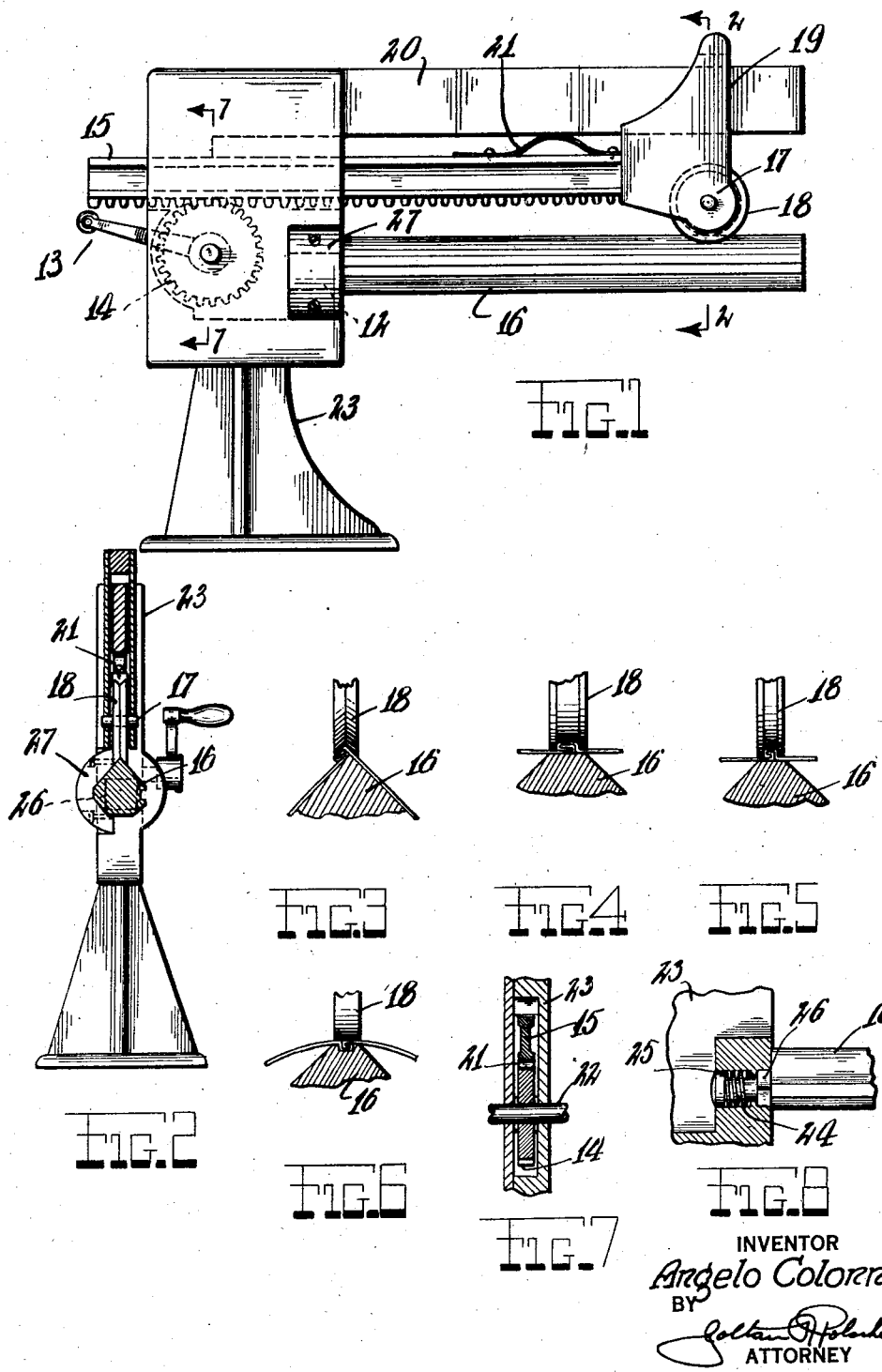
INVENTOR  
Angelo Colonna  
BY  
ATTORNEY Patented Sept. 27, 1927.

1,643,576

UNITED STATES PATENT OFFICE.

ANGELO COLONNA, OF PHILADELPHIA, PENNSYLVANIA.

BOX-JOINT-GROOVING MACHINE.

Application filed August 24, 1925, Serial No. 52,057. Renewed August 13, 1927.

This invention relates to a machine for grooving or seaming and refers more particularly to an improved apparatus and method of forming grooves or seams although the invention in its broader aspects is not necessarily limited to any particular article but rather to all classes of materials where a groove or seam is required; such as in the manufacture of cans or containers, or in the grooving or seaming of sheet metal.

One of the objects of the invention is to provide an apparatus whereby a number of different kinds of grooves or seams are accomplished by the use of a provided adjustment.

A further object of the invention is to provide a ready and rapid means of changing said apparatus so that any other number of different kinds of grooves or seams are accomplished.

A still further object of the invention is to provide an apparatus of this character in which the parts are compactly arranged and so constructed that it may be readily operated.

An additional object of the invention is to provide an apparatus simple in construction and arrangement, durable in service, and a general improvement in the art, and in such further features of construction and operations as will more fully hereinafter appear.

In the drawings:—

Fig. 1 is a side view of my apparatus,

Fig. 2 is a cross-section on line 2—2 of Fig. 1,

Fig. 3 is an enlarged fragmentary section similar to Fig. 2.

Fig. 4 is an enlarged fragmentary section showing a different application,

Fig. 5 is an enlarged fragmentary section showing a still different application, Fig. 6 is an enlarged fragmentary section showing other applications, Fig. 7 is a fragmentary section on line 7—7 of Fig. 1, and Fig. 8 is a fragmentary section showing the invention of the end of the forming bar in the frame.

Describing in detail the apparatus shown in the drawing:

The apparatus may be operated by means of a crank 13 or other suitable handle or hand wheel, or may be driven by a suitable belt extending over a pulley, so arranged to cause the gear 14 to operate the rack 15 along the forming bar 16, said forming bar 16 having a suitable bearing 17 for the forming wheel 18, said rack 15 having a suitable guide 19 to properly guide said forming wheel 18, the said guide 19 being held in place by the protruding bar 20, and the spring 21 placed between said rack 15 and said protruding bar 20 causing the proper tension or force to be applied to the said forming wheel 18.

While the form of groove or seam will of course vary with the particular forming wheel 18 and the forming bar 16 used, depending upon the groove or seam desired and its location on the can, container, or sheet metal to be formed or grooved, it is shown as having an outer peripheral groove or seam on the corner of the can, container, or sheet metal, in Fig. 3. In Fig. 4, I have shown another type of outer peripheral groove or seam on the straight part of the can, container, or sheet metal. In Fig. 5, I have shown a modified form of the groove as shown in Fig. 4. In Fig. 6 I have shown a groove or a seam on the inner peripheral of a round can, container, or curved piece of sheet metal. The invention is not necessarily limited to the types or location of the grooves or seams hereinbefore mentioned.

As shown in Fig. 7, the gear 14 is fixed to the shaft 22, to which is also fixed the crank 13, or other suitable handle, handwheel, or pulley said shaft 22 being suitably mounted or having its bearing in the frame 23.

In Fig. 8 I have shown the arrangement for adjusting the forming bar 16 to the desired position, depending on the style or form and the position or location of said groove or seam on the article or piece to be grooved or seamed. The coil spring 24 acting against said frame 23 and the shoulder 25 on said forming bar 16, by means of the square portion 26 of said forming bar 16 (which is snugly fitted in the square formed in said frame 23) holds said forming bar 16 in any desired fixed position. It also allows the said forming bar 16 to be pulled forward thus disengaging said square portion 26 of said forming bar 16, so that said forming bar 16 may be turned or adjusted to any one of the four desired positions. In event it is desired to change the forming bar 16, this is acomplished by removing the cover plate 27, shown in Fig. 1, and Fig. 2.

In the drawing I have shown the forming bar 16 as having four working edges although said forming bar 16 is not necessarily limited to this number of working edges, but may comprise any desired number of working edges, such as five, six, seven, eight, nine, or ten; it being understood that the said square portion 26 would be replaced with a portion or section having a number of sides to correspond with the number of working edges.

The forming wheel 18 may be changed when desired by removing the bearing pintle 17.

It will thus be seen that the invention not only greatly facilitates the work or operations necessary to accomplish four, five, six, seven, eight, nine, or ten; but that the invention also greatly eliminates the work or operations necessary to alter or change the apparatus to accomplish any number of desired grooves or seams.

Having thus described my invention, what I claim as new, and desire to secure by Letters Patent, is as follows:—

1. In an apparatus for forming grooves or seams, the combination of a frame formed with an aperture, said aperture being square at the front end, formed with a shoulder in the central portion, and round at the rear end, a forming tool engaged in said aperture, having a square portion engaging the square portion of said aperture, a central round portion, and a round shoulder at its rear end, and an expansion spring acting betwen said shoulders.

2. In an apparatus for forming grooves or seams, having a frame for supporting a forming tool, the combination of a front square portion, a central shoulder, and a rear round portion in said frame, a member depending from said forming tool, said member being provided with a front square portion engageable with said square portion, a central portion, and a rear shoulder, and a coil expansion spring around said central portion, said spring abutting against said shoulders.

In testimony whereof I have affixed my signature.

ANGELO COLONNA.